United States Patent [19]

Ernest

[11] 4,157,607

[45] Jun. 12, 1979

[54] METHOD OF MANUFACTURING AN INTERNAL COMBUSTION ENGINE CYLINDER HEAD

[75] Inventor: Robert P. Ernest, Dearborn Heights, Mich.

[73] Assignee: Ford Motor Company, Dearborn, Mich.

[21] Appl. No.: 835,948

[22] Filed: Sep. 22, 1977

Related U.S. Application Data

[62] Division of Ser. No. 753,347, Dec. 22, 1976, Pat. No. 4,136,648.

[51] Int. Cl.[2] ........................ B23P 15/00; B23P 13/00

[52] U.S. Cl. .............................. 29/156.4 R; 29/527.6; 164/309; 164/63

[58] Field of Search ............ 29/156.4 R, 527.5, 527.6; 123/41.82 A, 41.72, 41.74; 164/309, 63, 61

[56] References Cited

U.S. PATENT DOCUMENTS

| | | | |
|---|---|---|---|
| 1,495,478 | 5/1924 | Gibson | 29/527.6 |
| 2,004,959 | 6/1935 | Morin et al. | 29/527.6 |
| 2,026,904 | 1/1936 | Morin et al. | 29/527.5 |
| 2,681,054 | 6/1954 | Boghossian | 123/41.74 |
| 2,739,579 | 3/1956 | Ware et al. | 123/41.82 A |
| 2,767,694 | 10/1956 | Boghossian | 123/41.82 A |
| 3,106,002 | 10/1963 | Bauer | 29/527.5 |
| 3,448,505 | 6/1969 | De Castelet | 29/156.4 R |
| 3,468,295 | 9/1969 | Castarede | 123/41.74 |
| 3,757,850 | 9/1973 | Diez et al. | 164/309 |
| 4,059,876 | 11/1977 | Ditto | 29/156.7 A |
| 4,061,182 | 12/1977 | Diez | 164/309 |
| 4,066,057 | 6/1978 | Hale | 123/41.72 |

OTHER PUBLICATIONS

Wakefield, B. D., "Laser Right on the Beam for Heat Treating Duty", from *Iron Age,* Feb. 10, 1975, pp. 45–47.

*Primary Examiner*—Carl E. Hall
*Assistant Examiner*—Daniel C. Crane
*Attorney, Agent, or Firm*—Joseph W. Malleck; Olin B. Johnson

[57] ABSTRACT

An internal combustion V-8 engine is disclosed having an aluminum semi-permanent mold head cast by a low-pressure die-cast process and an iron block cast by the evaporative casting method. The block and head have controlled thickness walls throughout to optimally lower the metal/working volume ratio of the engine. The block employs barrel cylinder walls cast integrally and unsupported except at the barrel ends and at a siamese connection between adjacent barrels; the barrels are maintained under a predetermined level of compression to eliminate fatigue failure and suppress sound. The block is sand cast and the head is totally formed with a three piece die and one sand core cluster, except for one passage which is drilled subsequent to casting. The engine is reduced in weight by at least 20% over conventional comparable engines; torque and horsepower is improved even though the cooling system capacity has been reduced to less than half that of a conventional cooling system.

3 Claims, 39 Drawing Figures

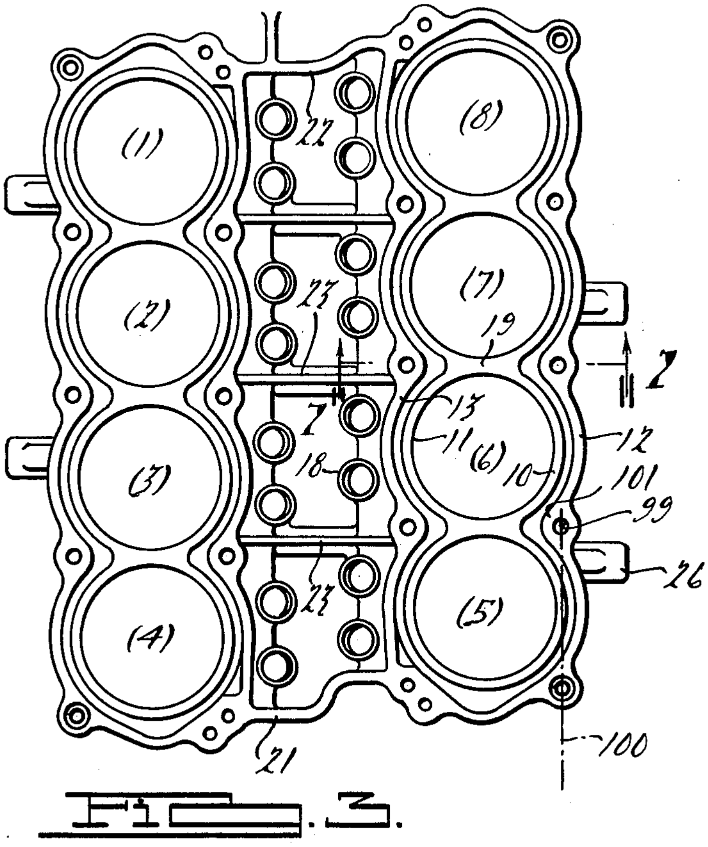
FIG. 3.
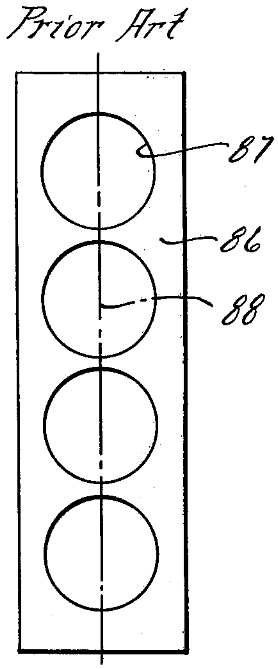
FIG. 6.
FIG. 4.
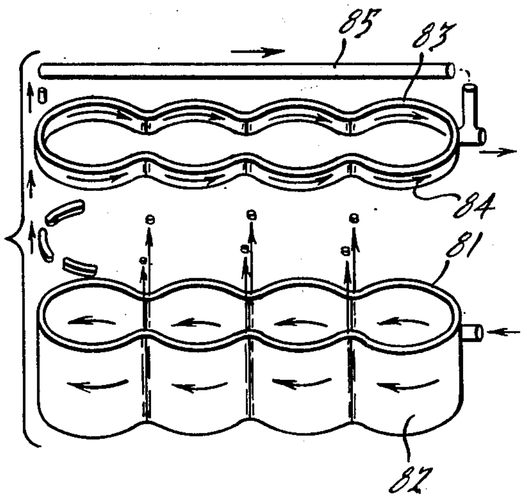
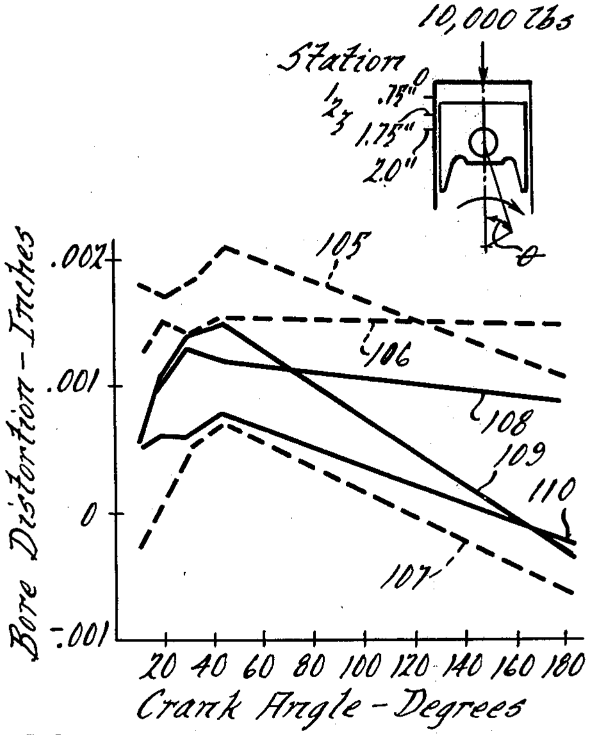
FIG. 8.

| Typical Engine Weight Reduction (lbs.) | | |
|---|---|---|
| Component | Typical Prior Art | Inventive Concept |
| Cylinder Block | 121.0 | 81.0 |
| Cylinder Head (2) | 88.4 | 38.0 |
| Intake Manifold | 42.0 | 17.0 |
| Water Pump | 15.1 | 6.5 |
| Exhaust Manifold/Reactor (2) | 29.0 | 31.0 |
| Pistons (8) | 10.7 | 9.2 |
| Crankshaft | 40.5 | 32.5 |
| Total | 346.7 | 215.0 |
| Total Weight Savings 1976 LWT = 131.7 lbs. | | |
| Water In Cylinder Block And Heads | 17.9 | 6.2 |
| Total Water Weight Savings 1976 LWT = 11.7 lbs | | |

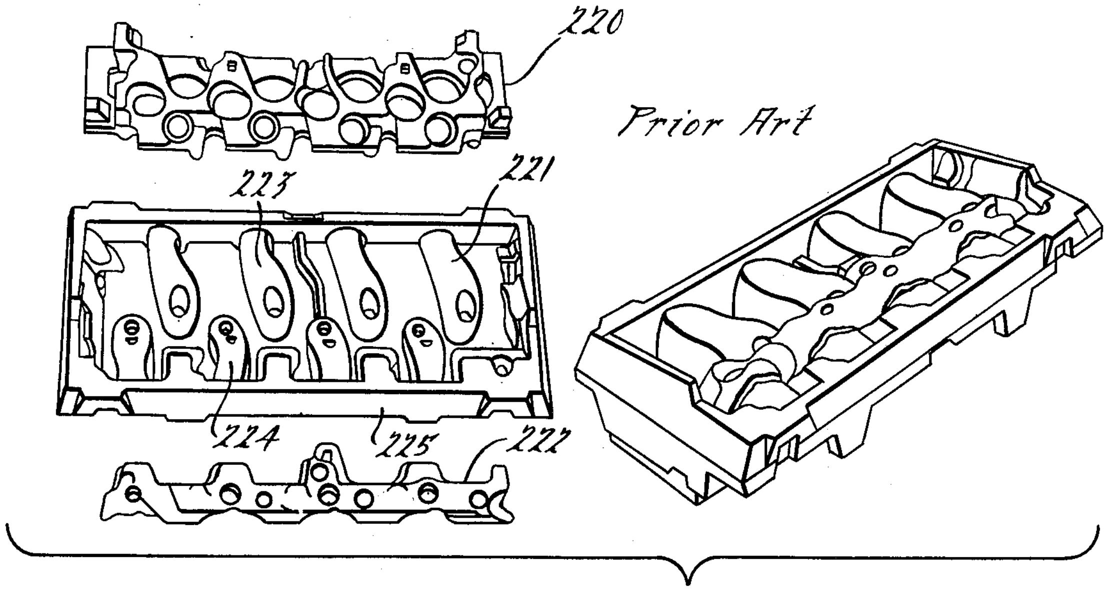
FIG. 39.
FIG. 21.
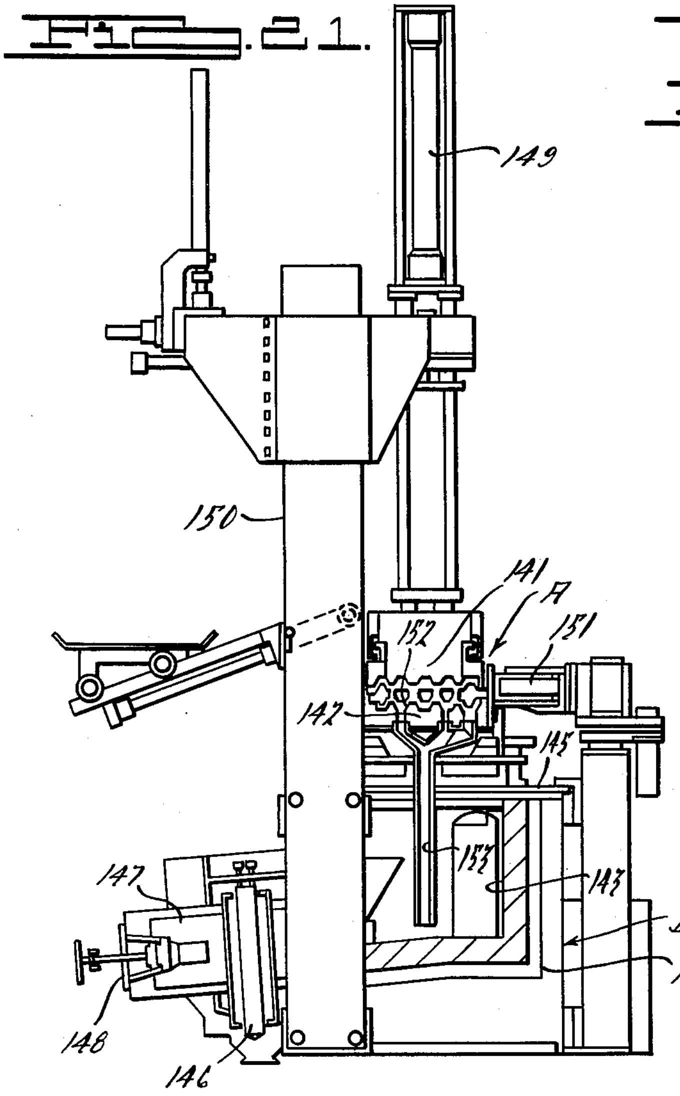
FIG. 13.
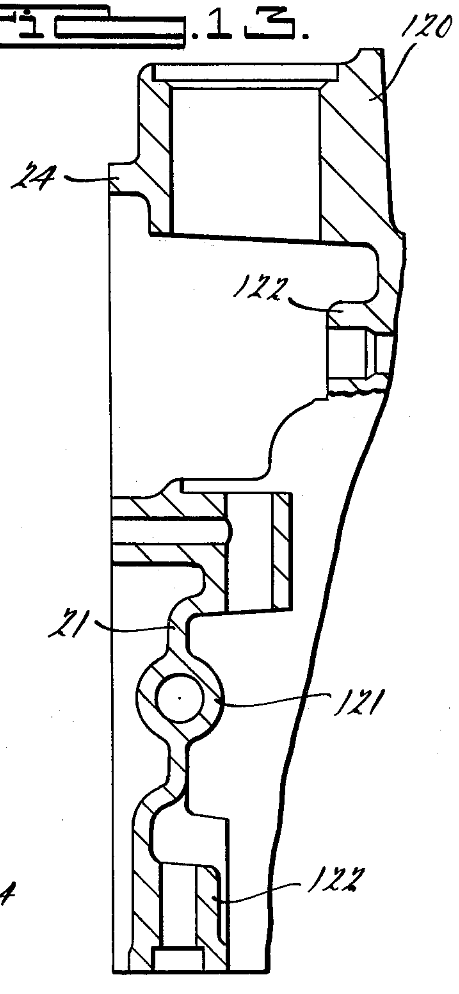

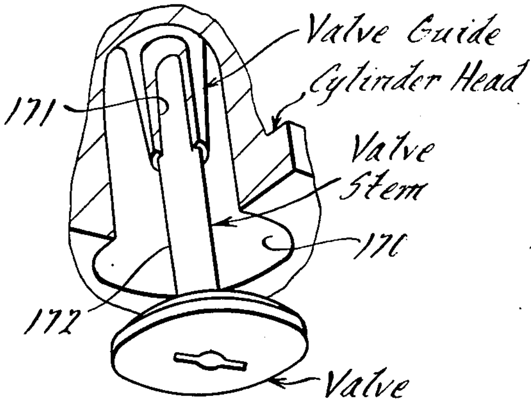
FIG. 25.
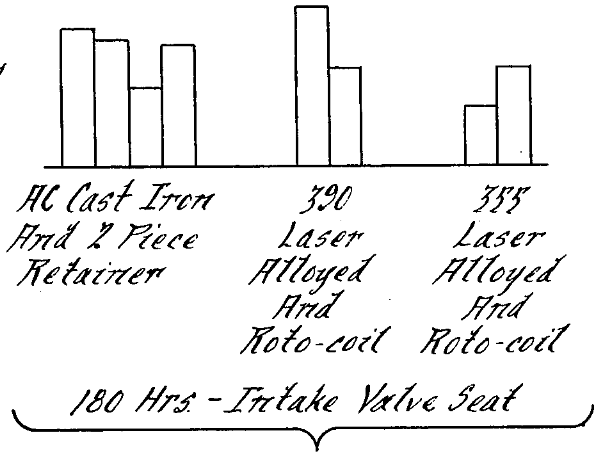
FIG. 26.
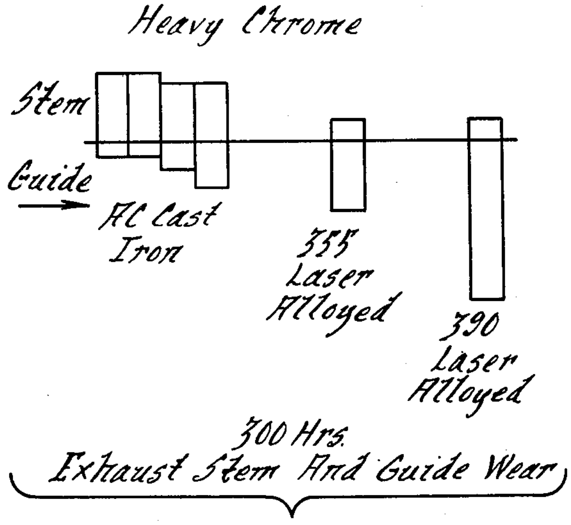
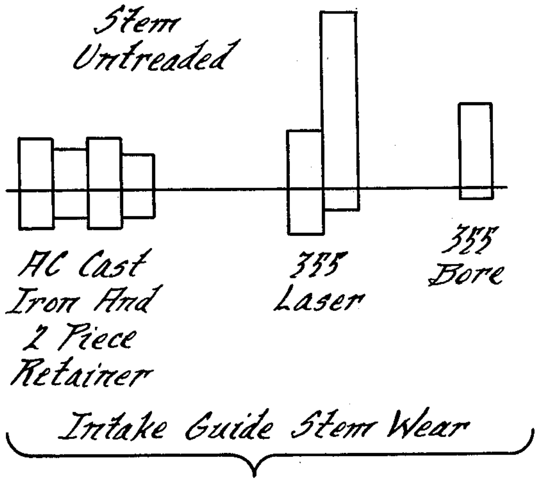
FIG. 28.
FIG. 27.
FIG. 29.
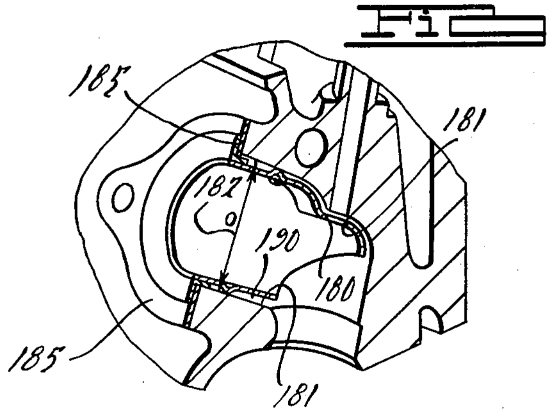
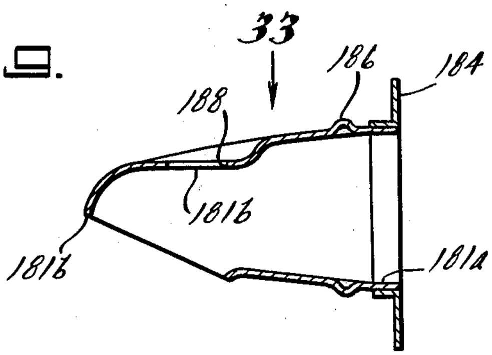
FIG. 30.

METHOD OF MANUFACTURING AN INTERNAL COMBUSTION ENGINE CYLINDER HEAD

This is a Division of application Ser. No. 753,347, filed Dec. 22, 1976, now U.S. Pat. No. 4,136,648.

BACKGROUND OF THE INVENTION

It has been common for many years to construct the cylinder housing for the majority of reciprocating engines of at least two pieces, a block and a head, each piece being cast of ferrous material in a sufficiently heavy and rugged configuration to provide a wide margin of safety against thermal cracking without serious regard to engine weight and energy dissipation. There has now been a recent movement to employ aluminum as a casting material for either said head or block or both. This movement is a natural outgrowth of the desire to improve fuel economy for a vehicle by measures which reduce weight. The savings in weight by use of aluminum is obvious and inviting. Employment of aluminum has lead to some changes in the method of constructing the head, but the design and mechanical configuration of the head have changed little as a result of the material substitution. Aluminum components can be cast by one of several different modes, each having their advantages and disadvantages. The earliest conventional mode was to use a typical sand casting technique; sand casting restricts the aluminum alloy selection to that which will develop proper dispersed precipitation particles at a slower chill rate or solidification rate, characteristic of sand casting. Some casters have turned to high pressure die-casting or permanent molding techniques which permit the employment of more advanced aluminum alloys; however, sand cores cannot be utilized with these methods and thus the freedom to design internal passages is restricted. In addition, each of these methods require from 1.5 to as much as three times the molten metal for the finished casting. High pressure die-casting usually requiring impregnation of the resultant casting, an expensive procedure.

Whether dictated by casting method or mechanical design, neither the wall thickness or wall arrangement of the castings have been appreciably reduced by virtue of the aluminum substitution and thus remain a common disadvantage. Nor have the engines employing components with substituted aluminum exhibited a worthwhile improvement in horsepower, engine efficiency and a reduction in emissions.

SUMMARY OF THE INVENTION

The primary object of this invention is to provide at least a 20% reduction in the weight of an internal combustion engine without causing a design cost increase. It is desirable to provide a low weight reciprocating engine having a reduced structural mass compared to engine components using the same material, even when compared to prior art engines already employing lighter weight material, which obtains increased engine performance and better material utilization. A specific object in this regard is to place at least the cylinder walls of the engine housing in a continuous state of longitudinal compression, the compressive loading being typically above 2500 psi. Such loading facilitates the use of thinner light-weight walls. Additionally, the use of an open-deck design for forming most cooling passages facilitates the precise control and definition of said thin walls.

Specific design features pursuant to achieving improved material utilization, comprise: (a) use of thin barrels for the galley of cylinders, said barrels being unsupported along their sides except for a siamesed connection between consecutive barrels, the barrels being maintained in a compressively loaded condition; (b) increase of the size of bolt heads clamping said head and block together thereby imparting greater loading without rupturing the cast head; and (c) relocation of the bolts to a wider spacing equivalent to the spacing between transverse bulkhead walls aligned with the joint between the consecutive barrels; the arrangement promotes uniform distribution of the compressive loading across the open deck to prevent local distortion in the use of an inexpensive gasket functioning to seal between the head and block.

Another principal object of this invention is to achieve the above object of a low weight reciprocating engine by employing improved casting methods resulting in lower cost, greater productivity, simplicity of fabrication and better quality castings with less porosity. Head and block making is carried out without the use of water jacket cores; this is made possible by the opendeck design of mold patterns which allows any required coring to extend from the open-deck surface and be made ultra-thin.

Specific features pursuant to an improved method of making the head, comprise: (a) elimination of water jacket cores by reducing any water channels to ones which are exposed through the open-deck surface reachable by the die, said die having three pieces operable with one single sand cluster to define all the head surfaces and openings required under low pressure die-casting of an aluminum alloy, (b) the control of the low pressure die-casting technique to reduce oxidation and to require an amount of molten metal which is only 1.1–1.2 times the finished casting, (c) providing any total enclosed cooling passages by use of post-drilling performed after casting, all such drilling being straight to define simple cylinders. Specific features pursuant to an improved method of making the block, comprise: (a) the use of evaporative patterns for definition of the block, said block being formed in cast-iron and the pattern being prepared in two or three predetermined pieces to be joined during implanting within a sand mold for metal casting, (b) the patterns are constituted of an evaporative foam having open-deck cooling channels which can be filled with dry unbonded sand using either or both sand fluidizing and sand vibration, and (c) the pattern walls are substantially all limited to 0.12 to 0.15 inches, except at sealing or mounting surfaces.

Yet still another object of this invention is to provide a low weight reciprocating engine having improved control over energy dissipation within the engine housing; the improvement accrues not only from elimination of a typical water cooling jacket but also by use of a cooling system that matches varying material characteristics with a varying cooling flow rate to achieve a predetermined programmed temperature condition within the engine. Features pursuant to controlled energy dissipation comprise: (a) the use of shorter exhaust ports and larger port exhaust throat areas, (b) the use of a low density highly conductive material in the head to be matched with a high velocity cooling fluid flow therethrough, and a higher density, lower thermal conductive material in the block to be matched with a lower velocity cooling flow therein, (c) controlling the cast iron weight/working volume ratio to a predetermined value, (d) maintaining the wall thickness not only of the barrels defining said cylinders but also the other housing walls, including those cooperating to define said cooling passages, at a relatively thin and predetermined wall thickness throughout.

SUMMARY OF THE DRAWINGS

FIG. 3 is a view of the block construction for the engine housing taken along line 3—3 of FIG. 10;

FIG. 4 is a schematic illustration of the bodies of fluid which define the cooling flow for the cooling system employed in the construction of FIG. 1;

FIG. 6 is a schematic illustration of a galley of cylinders in a block characteristic of the prior art;

FIG. 8 is a graphical illustration of data representing bore distortion with respect to crank angle of the engine;

FIG. 13 is an enlarged sectional view taken along line 13—13 of FIG. 10;

FIG. 21 is an elevational view of low-pressure die-casting apparatus employed in making the head of this invention;

FIG. 25 is a fragmentary perspective view of a head valve and seat partially shown in cross-section and embodying some aspects of this invention;

FIGS. 26, 27 and 28 are graphical illustrations of certain wear surface data for the construction of FIG. 25;

FIG. 29 is a perspective sectional view of a portion of the head of this invention;

FIG. 30 is a sectional elevational view of the liner employed as part of the head construction of this invention;

FIG. 39 is a composite view illustrating the various sand core clusters employed by the prior art to produce the type of water jacket system used in the head of FIG. 25.

DETAILED DESCRIPTION

Figure 1:
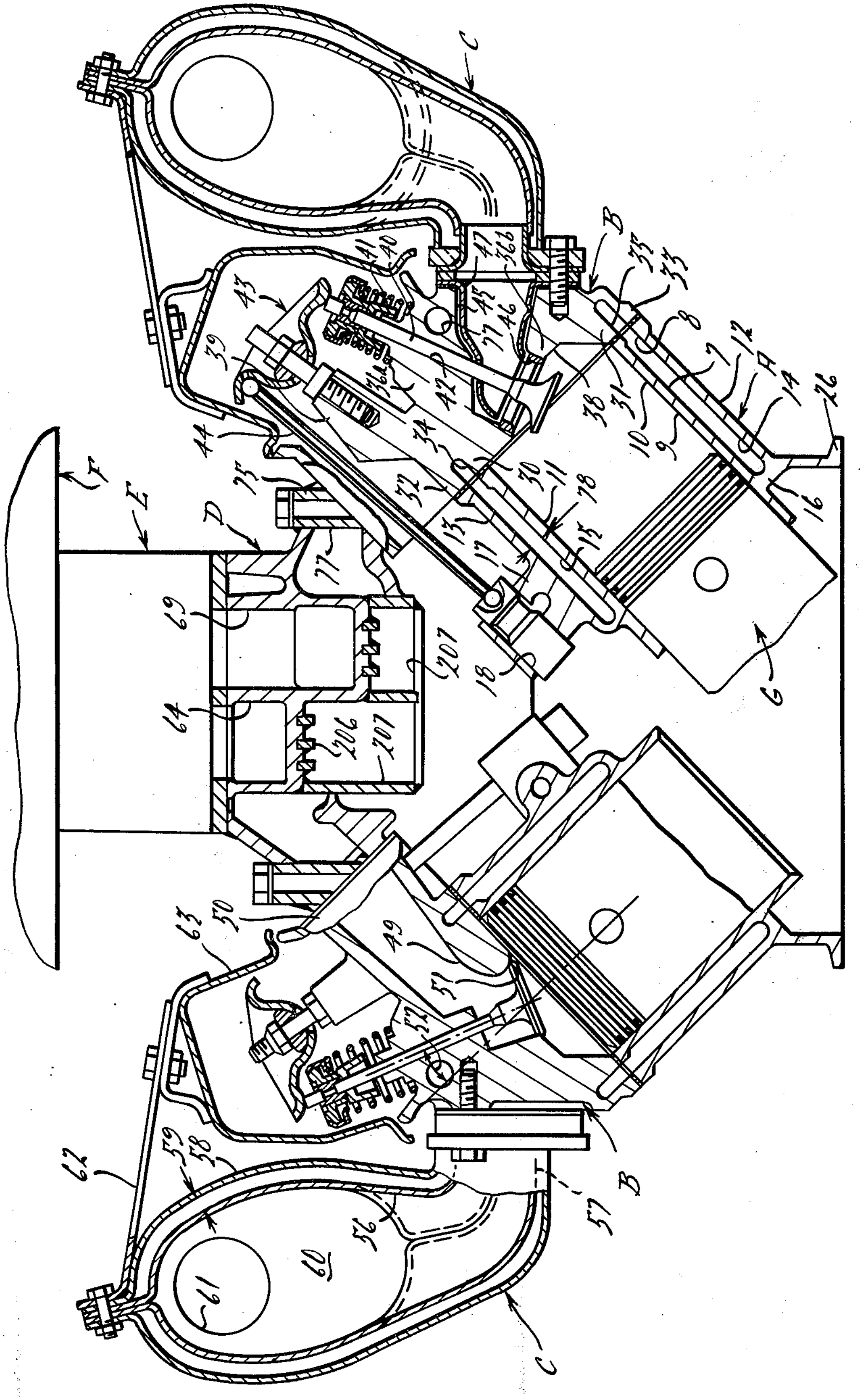
FIG. 1 is a sectional elevational view of an internal combustion engine employing the principles of this invention.
Figure 2:
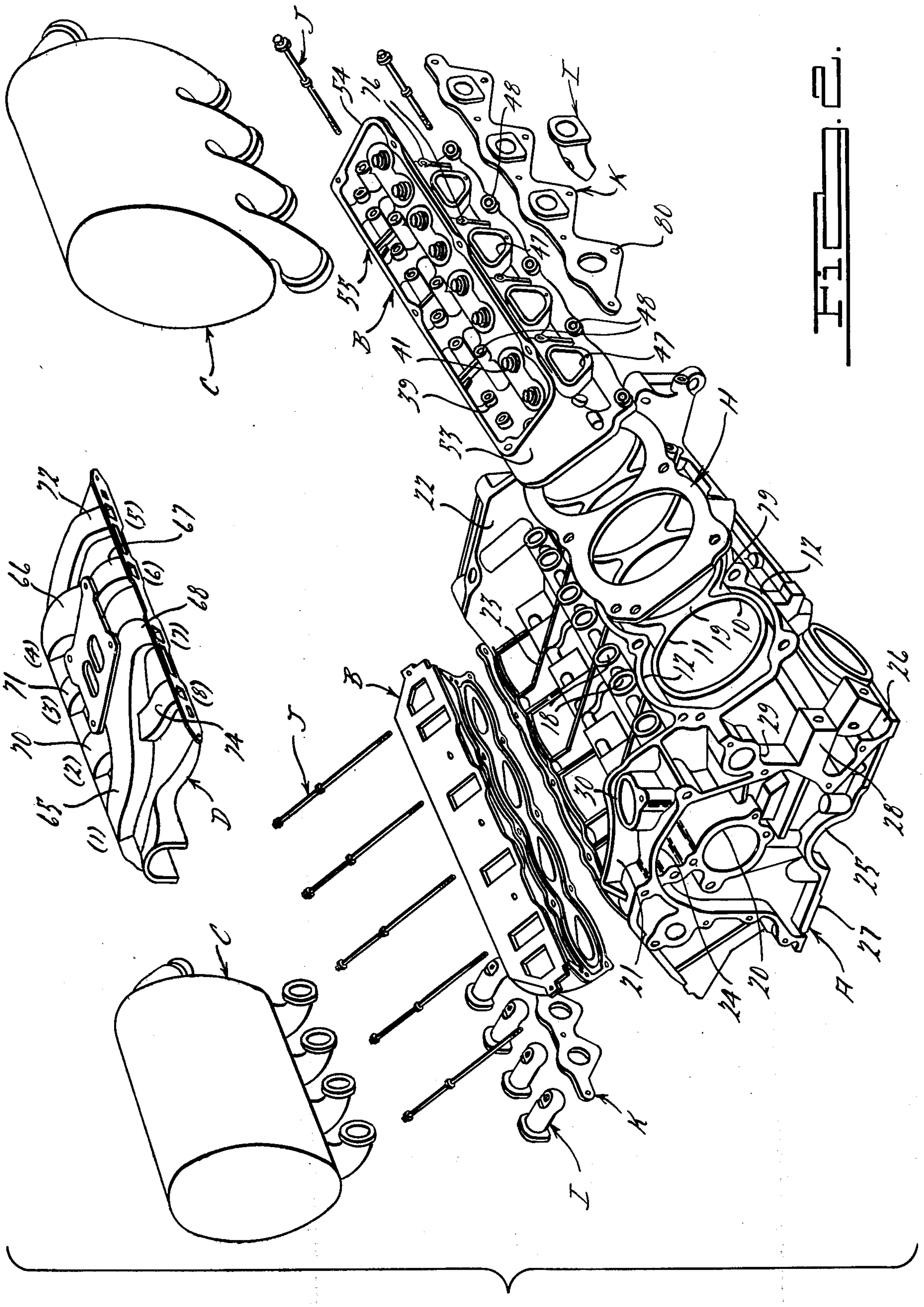
FIG. 2 is an exploded perspective view illustrating the components of FIG. 1.
Figure 5:
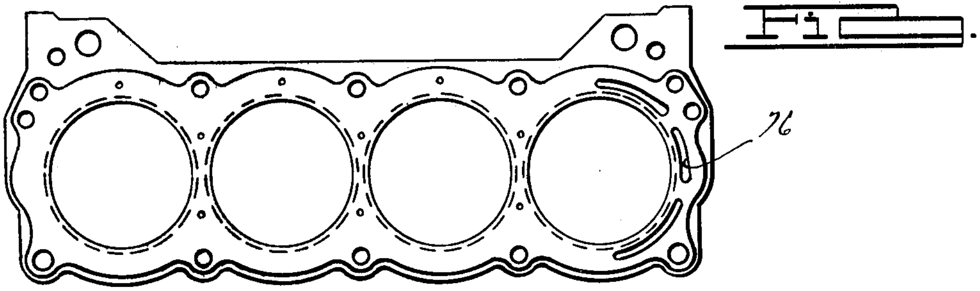
FIG. 5 is a plan view of one galley of cylinders for the construction of FIG. 1 with the deck gasket thereon.
Figure 10:
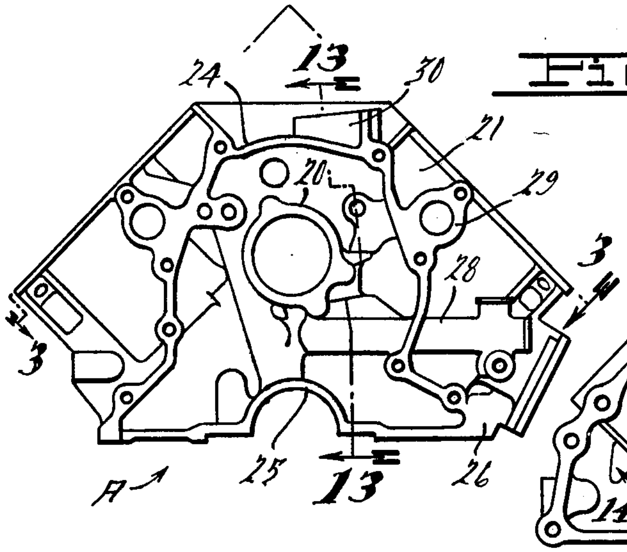
FIGS. 10 and 11 illustrate respectively different elevational end views of the block configuration of this invention.
Figure 11:
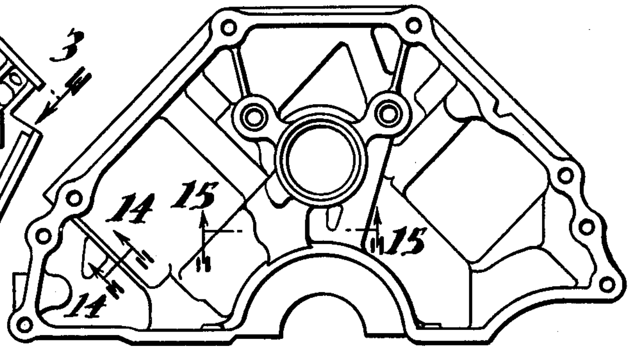

Apparatus:

Turning to FIGS. 1 and 2, the engine of this invention has a structure which is comprised of a V-type cast block, identified A, an I-type cast head, identified B, mounted on each cylinder bank A-1, a double-walled exhaust manifold C mounted upon each one of the heads, and a quick-heat type cast intake manifold D supported between each of the heads B; the engine further includes conventional components such as a carburetor E, air intake assembly F, and pistons G mounted within each of the cylinders of the block and connected to a crankshaft by way of typical connecting rods (not shown). As best shown in the exploded view of FIG 2, a metallic gasket H is employed between each of the heads and the block, exhaust port liners I are mounted in a unique position within each of the heads, and tension bolts J are employed to maintain the unique cylinder and barrel construction under compression.

The block has first wall portions comprised of outboard wall segments 10 and inboard wall segments 11 together define at least one series of uniformly thin-wall barrels, each tangentially connected at 19 in consecutive order to the next adjacent barrel. Said barrels each have an interior surface 9 defining a cylinder within which a piston operates. Second wall portions comprised of outboard wall segments 12 and inboard wall segments 13 define a series of integrally connected thin-walled barrels which overlap and intersect each other, but are interrupted at the area of overlap so that the interior surface 8 of said second wall portions define an opposing surface complimentary to that of the exterior surface 7 of the first wall portions. The first and second wall portions are uniformly spaced apart to define a groove 14 there-between which is closed at end 16 as cast.

The first and second wall portions (both in the block and head) define what will be referred to hereinafter as cylinder galleys having a water cooling circuit thereabout. Two cylinder galleys are arranged in a V-shape configuration and connected by transverse walls or bulkheads 23 (see FIG. 2) and by end walls 21 and 22, said bulkheads and end walls being parallel to each other and are connected to the second wall portion of said cylinder galleys along planes which generally include the points of tangency between first wall portions.

The block casting also has footings 26 which extend as flanges along the bottom of the end and bulkhead walls, the flatness of the cross flanges being interrupted to a crankshaft bearing surface, such as at 25. Reinforcing webs 24 extend outwardly from each end wall 21 and 22 respectively. Cylindrical surfaces 18, defined by bosses 17, are positioned inboardly from each of the wall segments 13, said cylindrical surfaces 18 provide a support for actuator rods forming part of the rocker arm assembly for the head. Wall portion 28 defined along the end wall 21, provides base metal for attaching purposes.

Each of the heads B' form a closure element for the grooves 14–15 and cylinder galleys in the block by engaging only the terminal areas of each of said first and second wall portions, by way of gasket H. Each head has first and second wall portions similar to that in the block, here identified as inboard wall segments 30 and outboard segments 31 forming said first wall portions, and inboard wall segments 32 and outboard wall segments 33, forming said second wall portions. The spacing between the first and second wall portions of the head define shallow grooves 34 and 35 adapted to be aligned with and in communication with grooves 14 and 15 in the block as permitted by openings in gasket K.

The head mass is oriented substantially in a triangular configuration in cross-section; the triangle has one upright leg at 36*a* and another upright leg at 36*b*, with the lateral or base leg at 37 containing the roof wall 38 to complete the definition of each of the cylinders. The upright legs of the mass carry flanges which in turn carry bosses 39; the legs 36*a*–36*b* also have cylindrical guide openings for the intake and exhaust valves stems. Bosses 39 support connecting rods 44 which act upon the rocker arm assembly 43 connecting with each of the valve stems 41. End walls 53 and 55 complete the head mass configuration. Walls or surfaces 45 define an exhaust passage which extends from an exhaust inlet seat 46 to an exhaust outlet 47. Walls 49 define an intake passage having an intake valve seat 51 and an intake entrance 50. Both of the intake and exhaust passage seats have centerlines which are aligned with stems of the associated valves and present an angle with respect to the centerline of the cylinder which is approximately 20° (see angle 52).

The block has at least the first wall portions formed as thin barrels (about 0.15 inches thick), unsupported along their sides except for a siamesed connection between consecutive barrels; the barrels are placed in a compressively loaded condition (at least above 2,500 psi) by tension bolts J extending through the second wall portions. The bolt heads are enlarged and bear against the upper side of the head; threaded bolt ends are received in the block casting at the base thereof. The bolt shanks are located to lay in or adjacent the plane of the bulkheads and in a plane which includes said points of tangency between barrels; the shanks are also located substantially 90° apart about any one barrel. The shank location facilitates more uniform high pressure loading of the gasket between the head and block without local distortion to promote more effective sealing.

Each of the exhaust manifolds C are of a double wall construction; a first wall has an entrance 57 commensurate in diameter with the exhaust passage outlet 47. Another wall portion 58 is spaced a distance 59 therefrom to provide a predetermined insulating air gap. Exhaust gases enter the main turbulating chamber of the manifold and migrate to the trailing outlet 61 which by way of a first passage (not shown) empties to ambient conditions. Suitable brackets 62 support the generally upright orientation of the exhaust manifold, said brackets being connected with a head cover of the engine.

The intake manifold D is comprised of an aluminum casting of the over and under type; the intake passages are arranged to pass over a labyrinth of hot passages 207 containing exhaust gases sequestered from the exhaust system. A first series of passages communicate one of the ports of the carburetor with cylinders 1, 4, 6 and 7 of the engine (see FIG. 3) while another passage communicates with cylinders 2, 3, 5 and 8. Passage 64 leads to legs 65, 66, 67 and 68 (see FIG. 2 which communicate with said intake ports or cylinders 1, 4, 6 and 7. The other passage 69 communicates with passage legs 70, 71, 72 and 74 (which respectively connect with cylinders 2, 3, 5 and 8). The casting has bosses 75 which carry bolts to connect the intake manifold with threaded openings in each of the heads.

One of the more critical aspects in reducing weight of the inventive engine herein, is the definition of cooling passages (grooves 14-15-34-35) to insure that cooling fluid enters at one end of the block, passes along one side of each of an aligned set of cylinders, (see FIG. 3) then in series is directed upwardly into the head and returns back across not only one side of each cylinder of an aligned set in the head immediately above those in the block but also through a drilled passage; the fluid finally exits from the end of the head at the same side from which it entered. This is series flow through both the block and head; little or no fluid is short circuited along this path. The flow is controlled in velocity at two different levels, one being at a relatively low velocity level in the block as permitted by the throat area of the passages defined therein and at a high velocity flow in the head controlled not only by the ingate aperture 76 of the slots in the gasket (separating the block and head) but also by the throat area of the passages in the head. As a result, the total fluid content of the system can be 1/5 that of conventional cooling systems and yet more effectively controls the dissipation of heat from the engine without affecting structural strength of the components thereof. As shown in FIG. 4, passages, for fluid passing through the block, are two in number, each (grooves 14–15) providing hemi-cylindrical wrappings 81–82 around each of the cylinders (about 4.25" in height); they join at the far end of the block and proceed upwardly into the head. In the head, there are three passages, two of which are again hemi-cylindrical wrappings 83–84 (created by grooves 34–35) along the sides of the cylinders, and a third (passage 17) which is a simple cylindrical boring through the length of the head, but spaced above and between each of the exhaust passages, creating a cylinder 85 of fluid.

The water jacket cores of the prior art are eliminated by reducing the water channels to ones which are exposed through the open-deck surface reachable by the die for casting the head or by dry unbonded flowable sand when casting the block. The elimination of water jacket core is facilitated by a most critically placed water passage; the latter is formed by drilling straight through the aluminum head at a location between the exhaust gas passages and the valve guide cylinders.

The spacing 78 between each of the first and second wall portions in either the head or block is regulated so that the width of the fluid wrappings is no greater than 0.50". The fluid at the locations 79, where the hemi-cylindrical contours are joined, would tend to create some degree of undesirable turbulence, particularly in the head where high velocity fluid is abruptly changing direction. Small ports 80 are provided in the gasket to communicate the inner most undulations of said paths and thereby provide a vortex shedding function.

It has been found by considerable experimentation that the combination of cast iron and a relatively low velocity flow, in the block, dissipates and controls the release of heat therein to maintain a wall temperature best suited to a slightly higher wall temperature in the head. The high velocity flow in the fluid passages of the head is adapted to work in conjunction with a high thermal conductivity material, such as an aluminum alloy. Heat dissipation is extremely effective to hold the wall temperature at a mean temperature of about 380° F. or less.

Resistance to Distortion:

In FIG. 6, there is shown a plan view of a conventional in-line block 86 utilized by the prior art. The cylinders 87 are surrounded by a unitary cast body which provides considerable mass surrounding totally each cylinder. Such a block is typically not loaded in compression; the head is merely attached securely to the block and the level of compression that may be exerted against any portion of the block walls is negligible. If one were to consider the type of mechanical loading that occurs in such a prior art block, consider the block divided along line 88*a* and also consider that prior art bolts are typically threadably receive in the upper portion of the block at locations such as at 88*b* placing the barrels in tension loading, not compression (cast iron is weak in tension). The upper portion of each barrel wall becomes a load bearing wall, and the short bolts do not place any significant compression upon the main barrel walls. To provide barrel distortion, a force merely needs to bear transversely against the upper portion of the barrel wall to induce a couple force setting up progressive local distortion. Distortion can be as much as 0.002 inches. It has been found by experimental effort, that use of a closed or tubular thin wall construction, with opposite ends of the tube placed under heavy compressive loading, fatigue life and the side loading character of such a structure is increased, resistance or distortion (out-of-round) is enhanced considerably, and noise is suppressed through the wall as a result of the high level of compressive loading and general geometric configuration of the surfaces. The distortion provided by a barrel wall supported according to the prior art and according to this invention will be different. For example, at station 3, the prior art has out-of-round distortion of as much as 0.0018 inches, while the structure of the invention undergoes distortion of only ±0.0007 inches. The test apparatus measured base distortion at four locations, one at the roof of the cylinder which was considered the base line, and three other stations, each spaced differently from the base plane the respective distances of 0.75", 1.5" and 2.0". The plots of bore distortion during engine operation for an engine block constructed as FIG. 8 is shown at 105, 106 and 107, each at the different measuring stations. Plots of bore distortion for a block under compression according to this invention is shown at 108, 109 and 110. Note the considerably higher bore distortion for the prior art design at each location.

Figure 7:
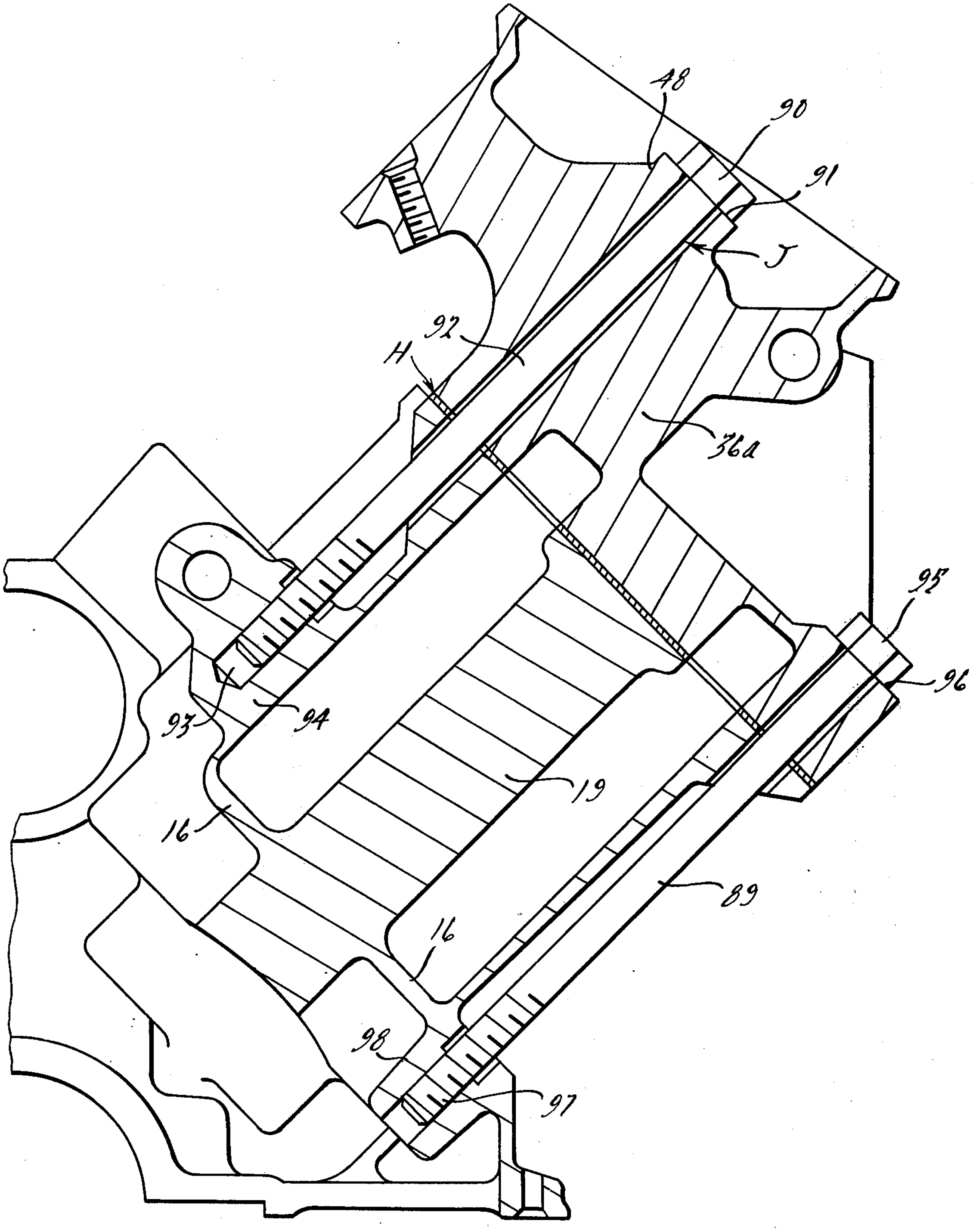
FIG. 7 is an enlarged sectional view taken substantially along line 7—7 of FIG. 3.

The point at which the compressive stress is applied to the barrel ends has been optimized. Tie bolts J are constructed in two pieces welded together to faciliate threading and heading. As shown in FIG. 7, the inboard bolt head 90 bears against a surface 91 of head B at one elevation and has a bearing surface of about 0.49"$^2$ to apply a bearing stress of about 18,000 psi. The opposite end 93 of bolt 92 is threaded into solid mass 94 of the block cast iron. Similarly bolt 89 has head 95 bearing against head surface 96 at a different elevation and end 97 is threaded to a mass 98 also at a different elevation of the block. The centerline 99 of each of the bolts is generally in line with either the most inboard or outboard periphery 100 of the first wall portions. The bolt centerlines are located in the inner-most undulation 101 of the second wall portion, and lay in planes adjacent to the plane of the bulkhead walls. Bolts are located 90° apart about the periphery of each barrel.

The gasket H is sandwiched between the head and block and is comprised of a thin stainless steel matrix embedded with asbestos binder, the gasket having a thickness of about 0.006". The compressive stress level provided in the wall segments 10-11-12-13 is about 3,000 psi and must be at least 2,500 psi. The repeated application of high and low pressure forces to the interior of the cylinder wall at different elevations throughout results in a force load pattern which not only varies with time but varies along the structural element. For distortion to take place, side loading must first overcome the static loading before distortion can begin to occur. In one sense, the bolts of this invention become the bearing support or wall, while the barrels are non-load supporting. Most side loading is caused by pressure forces in barrel at the upper 1/5 of its volume (at the compressed volume condition) and thus are directed at the upper portions of the barrels. Short bolts fail to withstand this side loading because of the lack of compression and because of their threaded base can move with the distortion.

By constructing the cylindrical walls as shown in 3, having a chain of tubes in siamesed connection, strength and resistance to fatigue and noise transmission is increased. Comparing construction 3 with that of an engine having walls structured like 6 the data of FIG. 8 resulted.

Method of Fabricating the Engine Block

Figure 9:
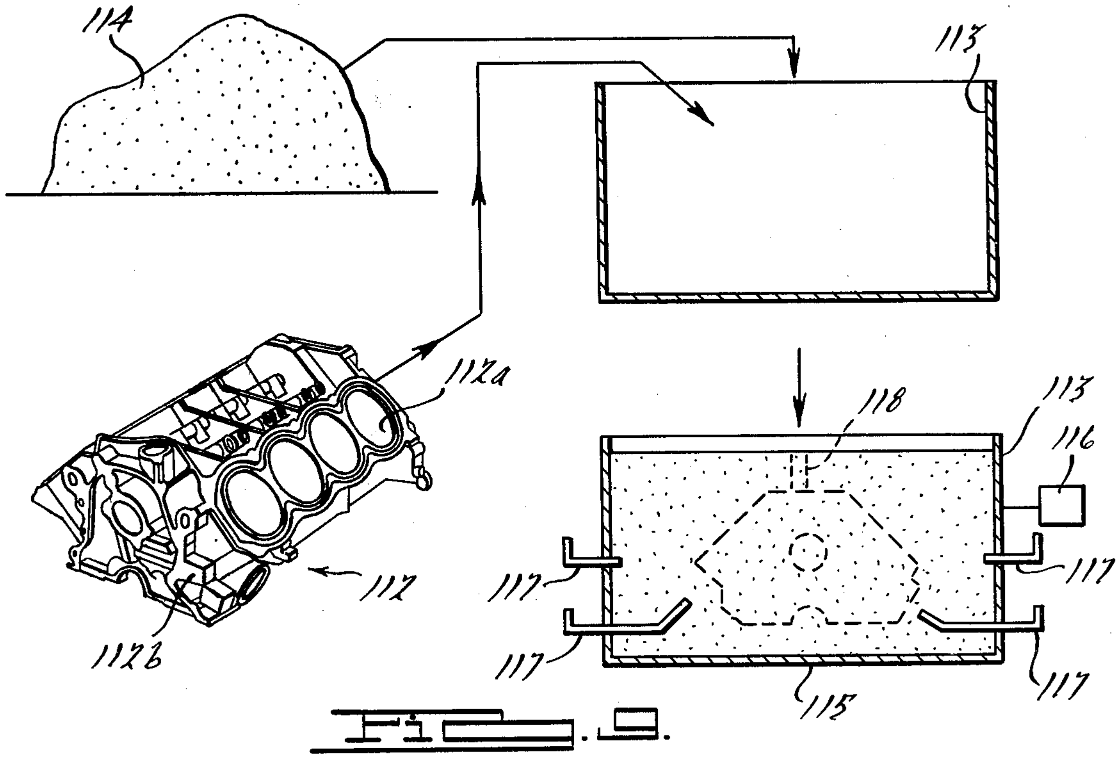
FIG. 9 is a schematic sequence view of the method of casting the block of this invention.

Turning first to FIG. 9, the schematic illustration set forth the basic steps of constructing a thin-walled siamese-connected free-standing cylinder wall block by the evaporative pattern method of casting. The method of constructing the block comprises essentially five steps:

1. First a consumable pattern 112 is formed identical in configuration to that of the block to be cast, said pattern being comprised of a material, such as polystyrene, which upon contact with the molten iron will be consummed and vaporized as a gas, the gas penetrating through the surrounding molding material. According to this invention, the polystyrene pattern 112 is constructed in at least two parts, one part 112*a* defining the terminal top rings of the first and second wall portions of each of the cylinder galleys, and the other part 112*b* defining the remainder of the pattern. The top ring part 112*a* is enlarged relative to the barrel walls to provide a better gasket sealing surface. The pattern may also be split at section planes beyond said two pieces to facilitate handling and fabrication. The pieces making up the pattern are then joined together at mating surfaces by a suitable adhesive which will be consumed the same as the polystyrene. The pattern should also include a consumable gating system (not shown in perspective).

The parts of the polystyrene pattern may be formed by a suitable steam pressure system whereby conventional beads of polystyrene are blown into a mold conforming to the shape of the block or pattern to be cast; under the influence of heated steam the beads are forced to join with each other and take the configuration of the mold.

2. After being formed as a pattern, the polystyrene pattern 112 is coated with a wash material to serve as a rigidifier and dimensionalizer for the outer surface of the casting, which coating is typically non-consumable and acts as the face of the mold during casting. The coating can be applied by immersion.

3. Upon completion of the fabrication of the pattern, the pattern will have a labyrinth of internal passages. The pattern is placed and suspended within a flask 113 into which dry, unbonded sand 114 of a typical chemistry is injected. To promote proper compaction of the sand in all the interstices and passages of the pattern, the flask may have a foraminous bottom 115 through which a vacuum pressure may be applied to draw the unbonded dry sand grains downwardly from the point at which they are introduced. In addition, vibration may be applied to the sides of the flask by a device 116, the vibration will in turn be transmitted through the dry sand grains to shift their position and assume a well compacted network in the lower regions of the flask 113 and within the lower regions of the pattern. Sand being added to the lower regions should be maintained in an air suspension or fluidized condition during the injection. High pressure air may be injected at nozzles 117 into regions such as the mid-section portion of the cylinder block and interior portions of the body of the pattern.

4. The molten metal is introduced to the foam sprew 118 of the pattern system and the pattern is then consumed by burning allowing the molten metal to proceed downwardly and fill all the spacing once occupied by the foam pattern.

5. Upon solidification of the casting, the flask is removed and the sand collapsed from both within and outside the pattern.

The finished block casting will be comprised essentially of said first and second wall portions defining not only the combustion chamber cylindrical walls but also a pair of continuous fluid passages about each of the cylinder galleys. The casting will have a plurality of transverse upright walls (here five) two of which are end walls; the casting will have longitudinally extending strips or webbings which act to reinforce said first and second wall portions and act as a closure for the grooves defined between said first and second wall portions. The casting will have supplementary walls carried as flanges or adjuncts to serve a variety of purposes including bearings for the crankshaft, cylindrical guides for actuating arms, fluid entrance passages, bolting pads for the block, and bosses to provide solid metal for fastening stations.

It is of significant note that the wall sections for the principal elements are controlled within close limits to provide a cast metal weight/engine displacement ratio which is no greater than 1:3. To this end, the uniform width of each of the first wall portions (10–11) is about 0.18" max., and the uniform thickness wall section of the second wall portions (12–13) is about 0.15" max. The uniform thickness of the intermediate upright wall sections (23) is about 0.20" and the thickness of the end wall upright (21–22) is about 0.25". The longitudinal strips or walls 16 providing the closure of the grooves and providing a webbing between adjacent first and second wall portions is controlled to a thickness of about 0.25"-0.30" (see FIG. 7). The adjoining connection 19 between adjacent barrels of the first wall portions, is controlled to a thickness at least 0.28".

The oil pan rails 26, which are provided at the base of each of the upright walls, have a thickness of about 0.25" to provide sufficient metal bulk for threading bolts.

Figures 12, 16:
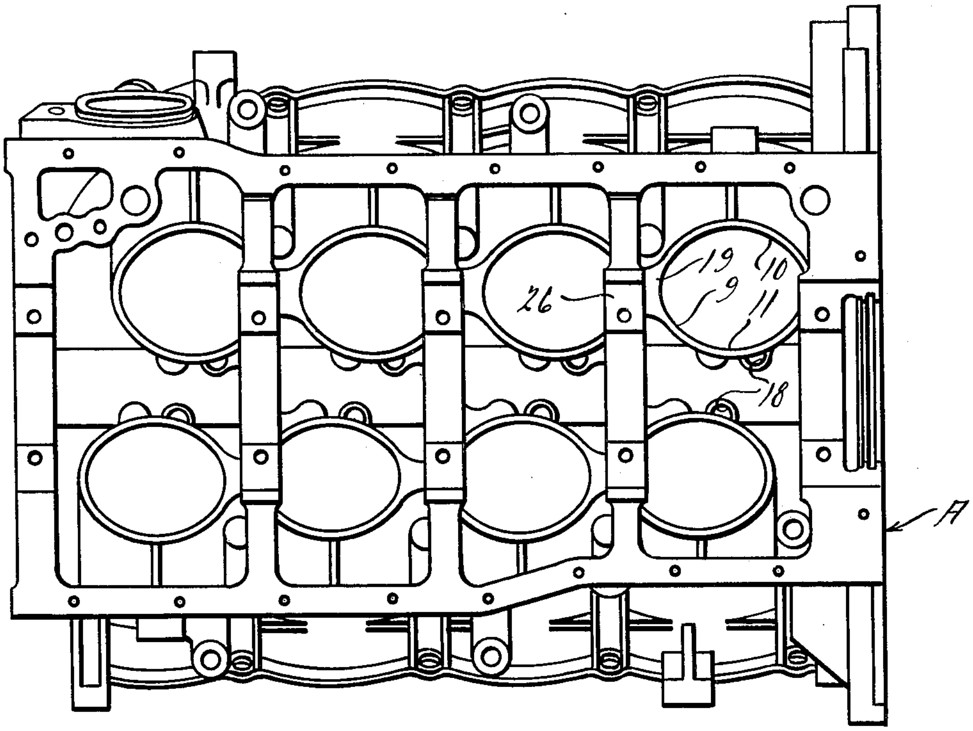
FIG. 12 is a bottom view of the block of FIG. 11.
FIG. 16 is a table of weight calculations for different components of an engine of the prior art and an engine of this invention.
Figure 14:
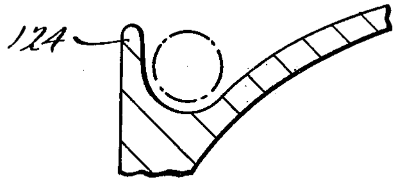
FIG. 14 is an enlarged sectional view taken substantially along line 14—14 of FIG 11.
Figure 15:
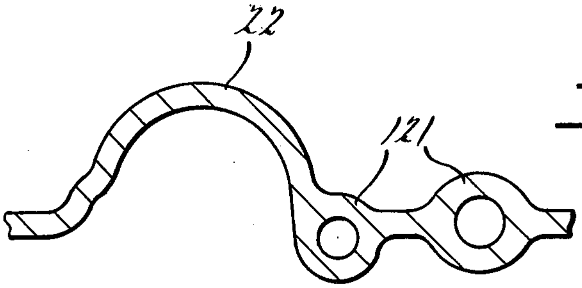
FIG. 15 is a sectional view taken substantially along line 15—15 of FIG. 13.
Figure 22:
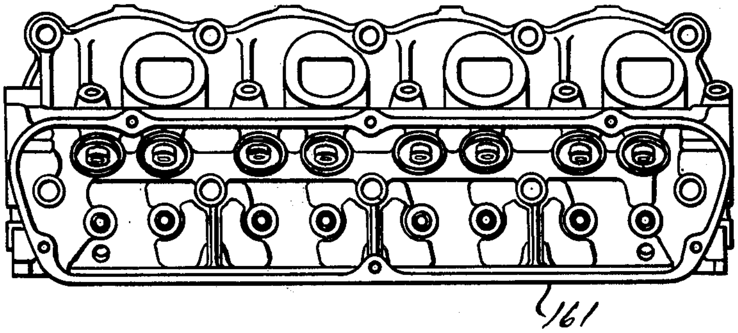
FIGS. 22, 23 and 24 are respectively a plan view, a side elevational view and a bottom view of a head of this invention.

The net result of controlling the wall thickness by the technique of evaporative casting, is illustrated in the table of FIG. 16. Weight calculations of a typical 1975 production V-8 type engine block is compared against a comparable engine block (effective to generate equivalent horsepower in a V-8 type configuration using the inventive concepts herein. The conventional 1975 production block is comprised of cast iron, just as is the block of this invention. There is a 40 lb. reduction in weight for the inventive engine block utilizing comparable materials but having the wall sections and design thereof rearranged.

Method of Making the Head

Figure 17:
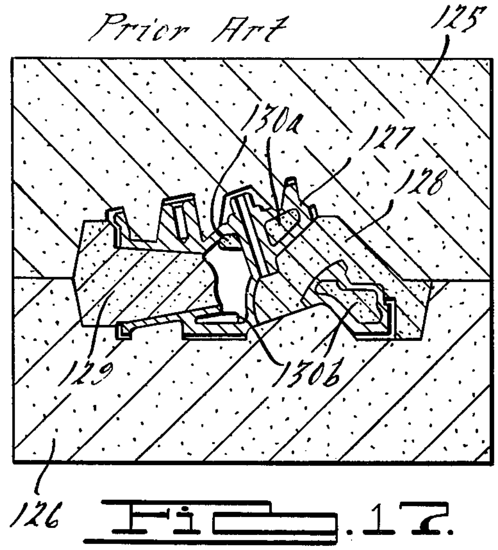
FIG. 17, is a sectional view of a typical sand cast mold for making a ferrous or aluminum head according to principles of prior art.

The typical prior art approach to obtain weight reduction by fabricating an aluminum alloy head is illustrated in FIG. 17. The method of the prior art is disadvantageous because it restricts the kind of aluminum alloy that can be employed. Sand casting requires a green sand cope 125 and a green said drag 126 defining substantially the entire outer surface of the head 127. Internal passages are defined principally by three sand clusters: a sand exhaust port cluster 128, a sand intake port cluster 129, and a two piece sand water jacket core (**130*a* and 130*b***). Accordingly, five sand molding elements are required to complete the mold configuration. This is unfortunate, the wear resistance of alloys that can be used with the chill rate of sand are not as wear resistant as desired. This usually necessitates the use of individual valve guide inserts, exhaust and intake valve seat inserts, valving seat washers, head bolt washers and heating heli-coil inserts at these wear stations. These inserts add substantial cost to the finished head. Moreover, the weight of such an aluminum casting is not optimized because of the lack of tighter control of wall thicknesses and the added content of cooling fluid. Sand casting is the current mode used by the prior art because it can provide simple to complex shapes by gravity feed, but results in low volume production. The variable cost of the sand cast technique is relatively high because of labor costs; the volume of metal employed is at least 1.56 times the metal in the finished casting and scrap is relatively high.

Figure 19:
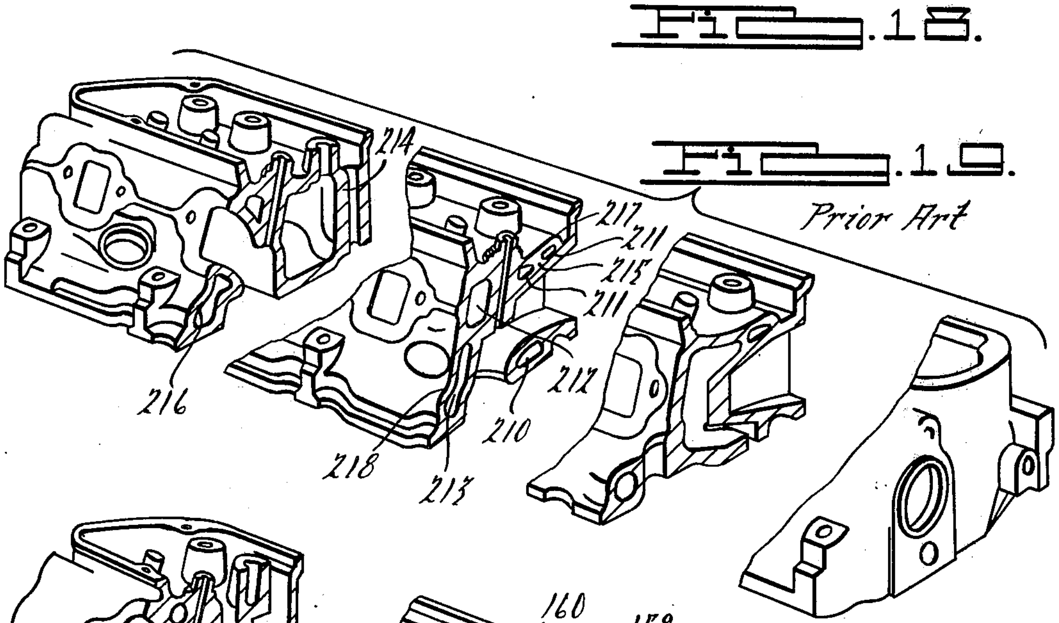
Fig. 19. Prior Art
FIG. 19 is an exploded perspective view of a head constructed in accordance with prior art (similar to that shown in FIG. 17), the head here broken at several planes.

The prior art method results in a casting (see FIG. 19) which will have extra wall sections, such as 214-215-216-217-218, necessitated by the intricate water passages 210, 211, 212 and 213. The thickness of the wall sections must be greater to accommodate stress due to a wider variation of thermal conditions throughout the head. The wide variation is due to over cooling due to excessive water jacket capacity, and under cooling due to the inability to locate water jacket cores where precisely needed. The scope of the extra wall sections needed to enclose the complex cooling passages of the prior art head can best be visualized by examining the resin-bonded core assembly that is used to define such passages, along with the cylinder portions and intake-exhaust passages (see FIG. 39). The core assembly is comprised of three parts: upper water jacket piece 220, intake-exhaust cluster 221 and lower water jacket piece 222. The volume of the intake-exhaust passages is molded by elements 223 and 224 respectively; the perimeter 225 supplements the sand cope and drag. Note the extensive cross-channels and changes in elevation of the flow path for fluid in either of the water jacket passages as defined by pieces 220 and 222. All these intricate passages must be surrounded by equally intricate wall sections which not only add weight but frustrate the capability of achieving a uniform wall temperature during operation.

If the prior art were to turn to alternative casting techniques, such as permanent mold, as known to the prior art today, the use of sand cores would be prohibited; this would make the technique unavailable for use in defining heads or blocks. Furthermore, permanent mold techniques require two to three times more molten metal than the weight of the finished casting.

Figure 23:
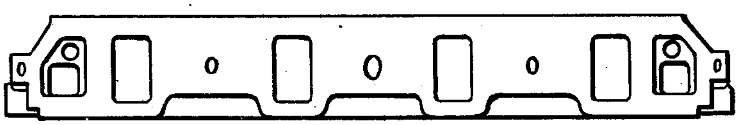
Figure 24:
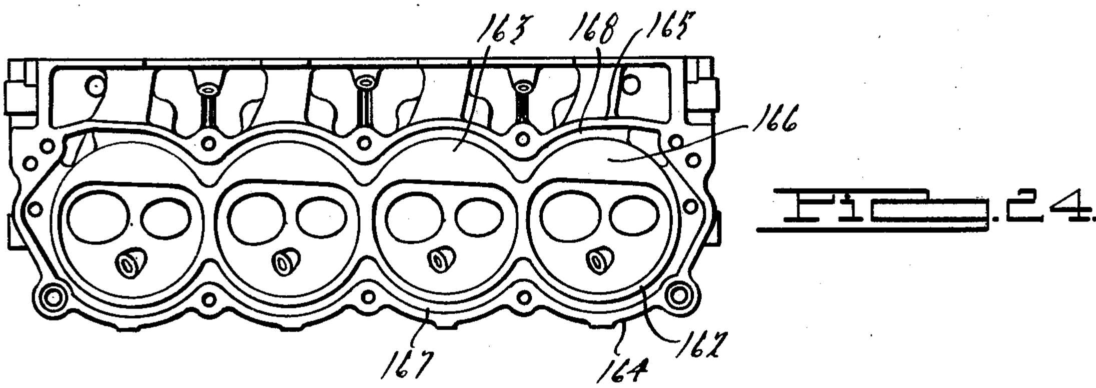
Figure 18:
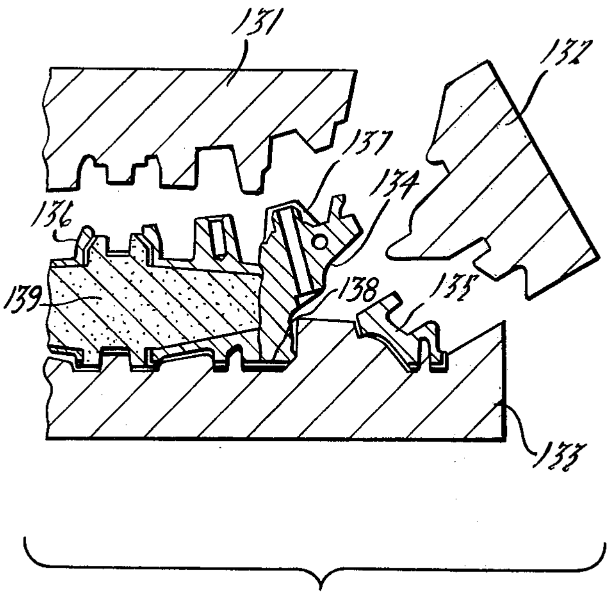
FIG. 18 is an exploded sectional view of the molding elements used to define the head of this invention; the elements include three dies and one sand cluster.
Figure 20:
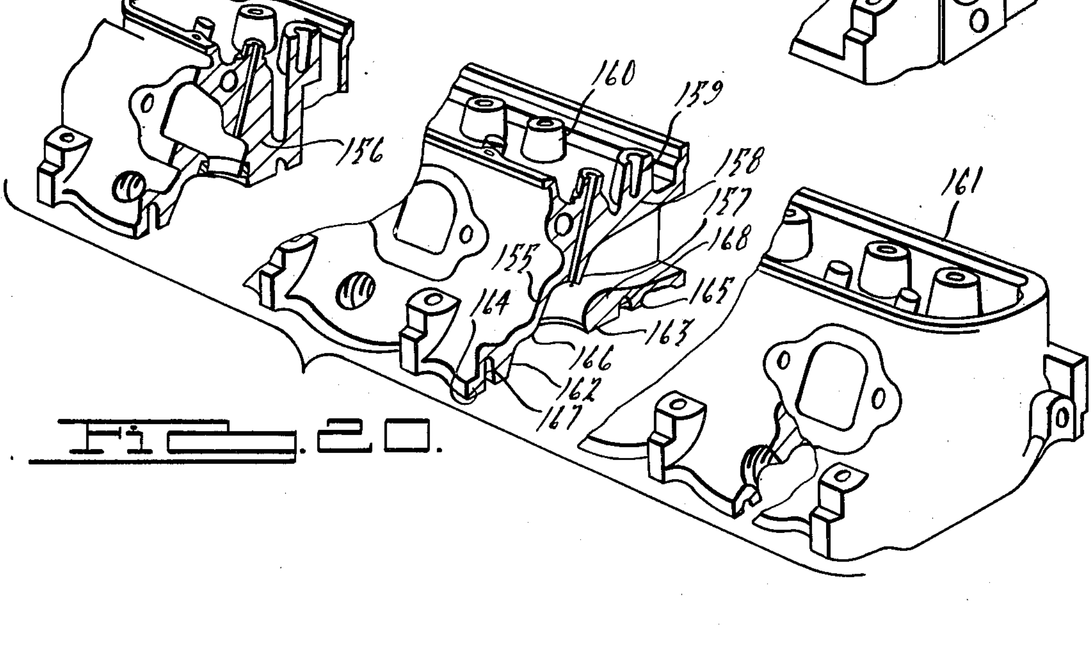
FIG. 20 is a view similar to FIG. 19 but illustrating a head constructed in accordance with the principles of this invention.

The approach of the present invention is to employ semi-permanent mold elements and utilize a low pressure molten metal feed. The method comprises (see FIGS. 18 and 20):

(a) Defining three semi-permanent mold die pieces (131-132-133), which when closed form essentially a triangular hollow configuration in cross-section, representing the casting. Each of the dies are adapted to define a galley of cylinder portions in the head structure and a series of exhaust passages 134. Each die defines some side walls (135–136) of the head and one of either the bottom or top walls (138–137). In addition, one single sand core cluster 139 is provided to define the intake passages of said head; the core cluster 139 is carried on die 133 by suitable extensions **133*a* of die 133. This results in a maximum cost effectiveness because it eliminates the water jacket cores 130*a*–130*b* and the exhaust sand core cluster 128 of FIG. 23. A metal mold cope 131 is substituted for that of the green sand cope and a metal mold drag 133** is substituted for that of the green sand drag. The method is adaptable to utilize all types of aluminum alloys even those with high silicon content; the inventive method can be used for casting simple to complex shapes and the amount of aluminum alloy oxidation on the surface of the molten metal is reduced, thereby lowering the amount of scrap and increasing the productivity potential to a higher level that is possible from any other casting process. The amount of molten metal required is only 1.1/1.2 times that of the weight of the finished casting thereby reducing the scrap rate considerably. The technique provides safer and cleaner facilities because molten metal is not exposed and is not poured in the open; molten metal is fed to the mold from the furnace located underneath the molding machine.

In FIG. 21, the comprehensive molding machine and molten metal feed is illustrated. The low pressure die casting apparatus consists of a molding assembly A-1 carrying the metal die casting elements 141–142 and sand core cluster, said assembly is supported upon a furnace B-1 which has a holding reservoir 143 lined with suitable insulation material 144 and is fillable through a pressure type filling cover 145. The molten metal is maintained at a proper heated condition by use of an induction coil 146 which surrounds a V-shaped induction channel 147 through which the molten metal is circulated and returned to the main reservoir. Removal of the metal from the holding reservoir can be had through a removal plug section 148.

The dies of the molding assembly are automated for movement into and out of position by way of a hydraulic lift mechanisms 149 supported on an upright 150, another hydraulic mechanism 151 effective to introduce the sand core cluster and still another hydraulic system is to move other dies.

When the die assembly has been automatically moved to a condition ready for receiving molten metal, the latter is forced into the molten metal cavity 152 by way of a riser tube 153 extending between the lower zone of the molten metal reservoir and the die cavity. Metal is forced into the riser tube by the application of pressure to the molten metal in the reservoir and by a decreased pressure in the die assembly cavity. Such pressure is maintained in the reservoir and on the metal in the die cavity until the cavity solidifies at the ingate. During the solidification process, with progresses from top to bottom, additional metal enters the mold to prevent shrinkage and porosity. This is contrary to a gravity process where solidification takes place from the bottom to the top. In the gravity process, to make up for shrinkage, many additional pounds of molten metal are contained in risers above the casting to feed it during solidification. This additional metal also solidifies and must be removed and remelted.

In the low-pressure machine of FIG. 21, clamping forces for the die elements are not high. Low pressure forces on the metal usually are 0.2 to 0.3 atmospheres which is considerably lower than that required for a high pressure die casting process normally in the range of 500–700 atmospheres. Because the pressure upon the molten metal is of a relatively low value, the sand core intake cluster can be employed. This permits considerable design flexibility compared with high pressure die casting or other techniques.

The inventive method provides several advantages, the most important is the reduced amount of oxidized molten metal that enters the mold. Since molten metal is pushed into the mold from the bottom of the furnace, oxidized metal stays at the top of the furnace and does not have to be skimmed off as in a gravity process. Secondly, there is the small amount of remelt. No ladles of molten metal need be moving about the operator. A low pressure machine occupies considerably less flow space and provides more flexibility in terms of production arrangement. Productivity resulting from the apparatus of FIG. 21 can be approximately 30 pieces per hour per machine. The machine can run with approximately a 3% scrap rate.

The cylinder head casting resulting from such method is shown in FIGS. 20, 22, 23 and 24. Although the casting is of an intricate shape, it can best be conveniently visualized as being constituted of two side wall portions 155–156 and a bottom wall portion 157 which together define somewhat of a triangular configuration extending the length of the head. In addition, a flange wall 158 extends outwardly from one of the side walls. Auxiliary bosses 159 and masses 160 are provided for various fittings, such as cylinders for receiving compression bolts and to act as guides for stems of the intake and exhaust valves or to act as fittings for actuating rods of the rocker arm assemblies. A peripheral wall 161 extends along one side of each of the heads adding additional reinforcement against distortion while in operation.

The first wall portions (162–163) and second wall portions (164–165) defining cylinders portions 166 have a wall thickness commensurate to their counterparts in the block. Such equivalent mass, however, renders greater thermal conductivity. The grooves 167 defined therebetween are arranged to act as two fluid paths in the head; each path has a uniform thickness no greater than 0.50", except at the innermost undulations there is an additional mass to surround and rigidify the wall accepting compression bolts extending therethrough. No exhaust valve seat inserts or valve guide inserts are employed. The first wall portions provide non-uniform thickness which is in large mass. If such walls were formed in cast iron, they would overheat and provide a preignition surface.

Resistance to Wear

Turning now to FIG. 25 there is a schematic perspective of the type of surfaces which receive considerable wear because they are adjacent the point of highest heat generation. This is at the valve seat area 170 and the surfaces 171 interengaging the valve stem 172. Since the head is comprised of a relatively non-resistant material, aluminum, it is important that these critical wear surfaces be augmented to provide good engine life. It has been found, in the course of this invention, that by constituting the head of an aluminum alloy 355, the cost and quality of the castings can be increased by deploying lazer alloying in a thin region along these wear surfaces. A high energy beam, particularly from a laser source, is concentrated on the area to be increased in wear resistance, and passed therealong so that the energy level at the surface interface (between the beam and alloy material) is at least 10,000 watts per square centimeter, and the beam is moved along sufficiently at slow enough rate so as to not only rapidly heat the affected material, but also to permit the heated zone to be rapidly quenched by simple removal of the laser beam as it traverses across the surface to be affected. To promote alloy diffusion within the surface, a prior coating of alloying ingredients can be used or an alloy wire can be fed into the high energy beam to be melted simultaneously along with the base material. In any event, the turbulency of the rapid heat-up efficiently mixes the melted base metal and the alloying ingredients which have either been pre-coated or added in wire form. Upon solidification, the heat affected zone has a highly rich alloy which is not merely attached as an independent layer but is an intimate mixture of alloying ingredients forming part of the base metal. It has been found by test data, that an aluminum alloy 355 (lower in silicon content than 390) is more effective in providing wear resistance in the valve guide cylinders and intake valve seat and valve force areas than any other known combination of materials when utilized with a low pressure die-cast aluminum head.

Data to support this phenomenon is shown in three respective graphical illustrations. Turning first to FIG. 26, intake valve seat recession information was generated by operating an engine head under temperature conditions to be experienced in an engine.

For purposes of this test, three different embodiments were tried, each run for 180–300 hours. An engine having a 302 cubic inch displacement was fitted with either an as-cast iron head or one of two aluminum heads in accordance with the invention herein, one aluminum head was provided with a 390 aluminum alloy laser alloyed at the selected surface and having a roto-coil; the other aluminum head had a 355 aluminum alloy laser alloyed (also with a roto-coil). The shaded area represents the valve face area. In those instances where the laser alloy was employed, it is important to point out that it was only applied to the valve seat area and not to the valve face area.

It was found that the head constituted of as-cast iron with a two-piece insert retainer (characteristic of the prior art), showed a typical seat recession of around 1.8 or 1.9 times $10^{-3}$. As shown in FIG. 27, the aluminum heads lasted with comparable wear (300 hours with slightly more than $3\times10^{-3}$ wear for 300 alloy and 300 hours with about $2\times10^{-3}$ wear for the 355 alloy).

As shown in FIG. 27 the exhaust valve stem wear was measured and plotted with the exhaust valve guide wear. For each of the three types of heads tested, the valve stem wear and valve guide wear was only slightly in excess of the as-cast iron embodiment, the difference was not substantially great for the 355 laser alloyed embodiment although the 390 laser alloyed embodiment showed a greater deficiency.

In FIG. 28, the intake valve stem wear and intake valve guide wear was plotted. Only the valve guide was provided with laser alloying treatment, not the intake valve stem. The guide, which was laser alloyed showed in one experimental embodiment an undesirable amount of wear but in the other embodiments a superior reduction in wear was exhibited when compared to as-cast iron.

Exhaust Port Construction and Heat Control

Due to the high thermal conductivity of the aluminum alloy material, constituting said head, it is of sufficient importance that insulation be developed for the exhaust ports; that exhaust gas heat must be maintained at a high enough temperature to continue latent emission burning for reducing the noxious emission content of the gases at the exit end of the exhaust system. The emissions problem would be aggravated by the quick withdrawal of heat from the exhaust gases through the aluminum material. A solution to this problem is presented by the use of a (a) cantilevered exhaust port liner 180, (b) arranging the exhaust port passage 181 to be substantially a straight-through design, and (c) to increase the throat area 182 of the exhaust port without affecting the structural integrity of the head. The exhaust port liner 180 is constructed a material having a shape as shown in FIGS. 30, 31, 33 and 34. The wall thickness of the metal liner is about 0.030 in.; the liner has a flange 184 welded to the outlet end 181*a;* the flange is sandwiched between the outwardly facing margin 185 of the head about the exhaust port and the manifold mouth fitting thereover. The inwardly extending structure of the liner lays within a geometric projection of the exhaust passage outlet opening projected perpendicular to the plane of the outlet opening). This facilitates insertion and requires the passage to have a more straight through design. The included angle between the planes of the exhaust passage inlet opening and outlet opening is about 60°. Spacing between the interior surface of the exhaust port and the liner is principally controlled by dimples 186 which touch the wall of the exhaust port 181 at only a point or line contact. The interior end 181*b* of the exhaust port liner is maintained in a free self-supporting condition not in contact with the interior of the exhaust passage. The liner has a depression 181*b* and opening 188 to accommodate the valve stem therethrough.

Figure 34:
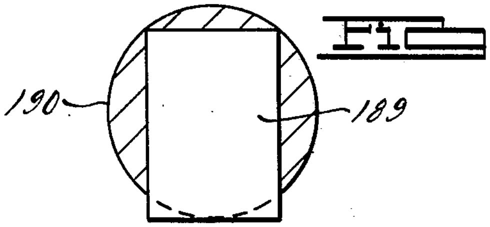
FIG. 34 is a view comparing the typical throat areas of the exhaust ports of the prior art and of this invention.
Figure 35:
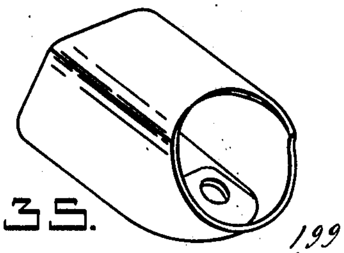
FIG. 35 is a perspective view of a body representing the air gap between the liner and port wall.
Figure 31:
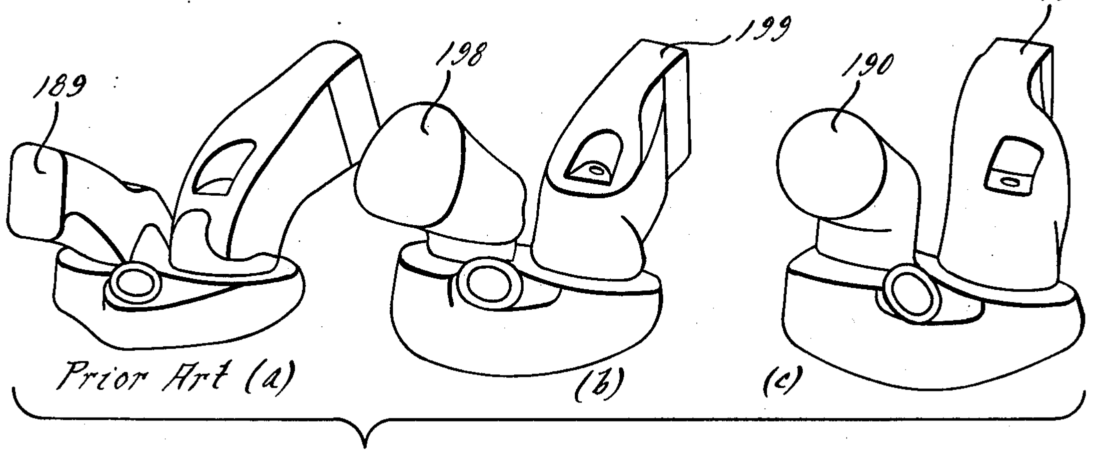
FIG. 31 is a composite view of volumes occupied by the intake and exhaust passages, one of which is of the prior art and the others of the present invention.

The throat area 182 of the exhaust port has been increased over that compared to the prior art. This can best be visualized by comparing the part (a) structure of FIG. 31 (prior art) with the part (c) structure thereof (invention). The exhaust port of the prior art has a semi-rectangular terminal or end portion 189, the area of which is smaller by at least 20% than the circular area 190 of the flow area of this invention. FIG. 34 compares such areas. The volumes 199 of the intake ports in each of these comparative figures do not vary substantially since this is a relatively low thermal heat zone and each are formed by a sand cluster comparable to the prior art. Part (b) structure of FIG. 31 illustrates the exhaust port volume when the liner is not in place; note larger throat area 198.

The air gap or space 190 between the liner and the interior of the exhaust passage 181 is relatively thin as shown in FIG. 29 where the volume of the air gap is solely depicted. The uniformity of such spacing is about 0.045 in.

Utilizing the principles of this invention as disclosed herein, for both the block and the head, as well as utilizing an aluminum alloy intake manifold, double-walled exhaust manifolds, along with aluminum pistons and conventional crank shaft and water pump, the total engine weight savings can be that as projected in FIG. 16 at about 130 lbs. The weight savings due to the smaller volume of cooling fluid adjusts the total weight savings to be about 138 lbs.

Figure 36:
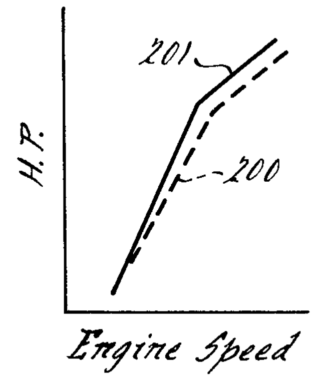
FIGS. 36, 37 and 38 are graphical illustrations of certain engine operating data for an engine employing the present invention.
Figure 37:
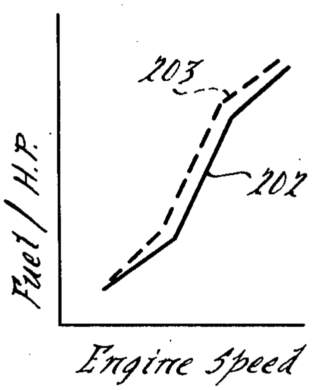
Figure 38:
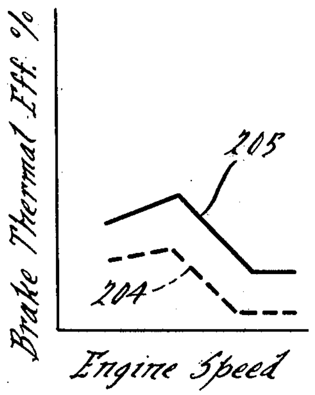
Figure 32:
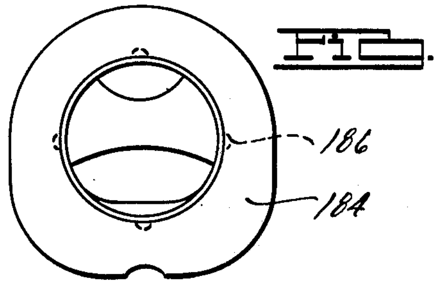
FIGS. 32 and 33 illustrate end and top views of the liner construction of FIG. 30.
Figure 33:
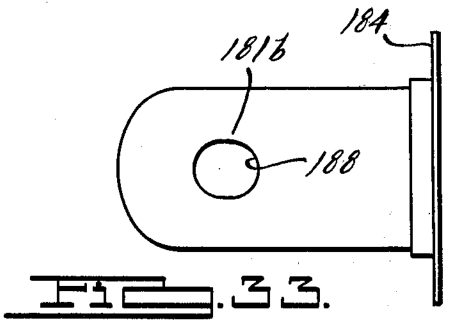

Engine performance is increased as indicated by data plotted in FIGS. 36, 37 and 38. FIG. 36 shows horsepower varying with engine speed, plot 200 illustrates that for an engine structured according to the prior art and plot 201 is that for the inventive engine herein.

The fuel savings for each unit of horsepower, shown plotted against engine speed in FIG. 37, again demonstrates increased economy realized through the combination of features of this invention; Plot 202 is prior art and Plot 203 is for the present invention.

Break thermal efficiency (in percent) is plotted against engine speed in FIG. 38. The engine employing inventive concept (Plot 204) has an increased break thermal efficiency when, compared to the prior art (Plot 205).

I claim:

1. A method of making a head for an internal combustion engine by injecting molten aluminum into a molding assembly, the molten aluminum being withdrawn from a reservoir located beneath the molding assembly, comprising:

(a) preparing and providing three dies of generally equal length adapted to form said molding assembly except for a plurality of intake ports, the dies each having molding faces such that when brought together a closed hollow configuration is formed into which said molten aluminum is injected, said configuration defining cast walls for head sides, top and bottom, for a galley of cylinder roofs and a series of exhaust passages, and for thin continuous water passage grooves extending sequentially along one side of each of said cylinder roofs, each die defining part of the side wall of the head and one of either the bottom or top wall, (b) preparing and providing one disintegratable sand core cluster to be carried by one of said dies and to be enveloped by said die assembly when in the closed condition, said core cluster being effective to define a series of intake passages upon completion of said method, (c) inserting said sand core cluster into said carrying die and bringing said dies together to form a molding cavity devoid of separate inserts, (d) by way of a tube communicating said molding cavity and a lower zone of said molten metal, decreasing the pressure in said cavity causing molten aluminum to rise into said cavity free of oxidized metal, (e) allowing said casting to solidify and stripping said dies and cores therefrom, and (f) drilling central boring through said head above and between each of said intake and exhaust passages, said drilling being placed in communcation with said grooving by way of a passage defined by said dies.

2. The method as in claim 1, in which said pressure is decreased to create a low pressure force of 0.2–0.3 atmospheres urging said molten aluminum into said cavity.

3. The method as in claim 1, in which rear surfaces of said aluminum casting are subjected to high energy beam alloying wherein a high energy beam is passed along the surface zone to be affected with alloying ingredients superimposed thereover, said alloying ingredients and surface zone aluminum melting, mixing and cooling to form a wear resistance aluminum alloy.

* * * * *